June 22, 1965     TATSURO KOMATSU     3,190,989
DETACHABLE AUTOMATIC TEMPERATURE CONTROL PLUG
Filed Feb. 14, 1962     4 Sheets-Sheet 1
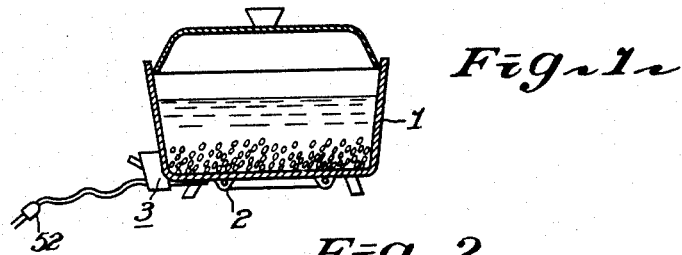
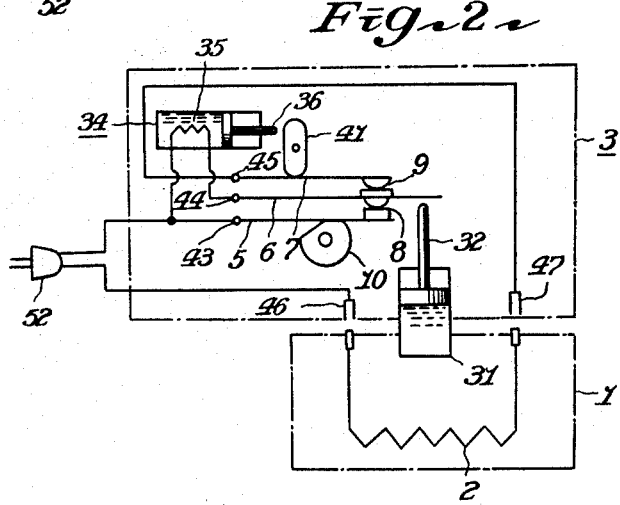
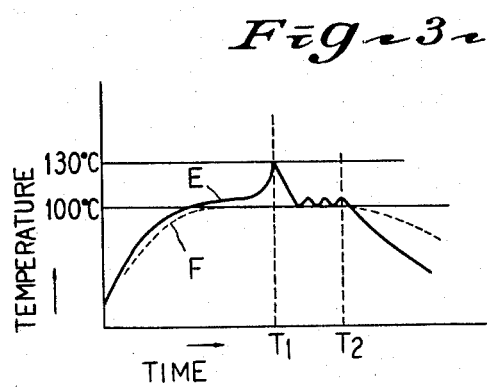

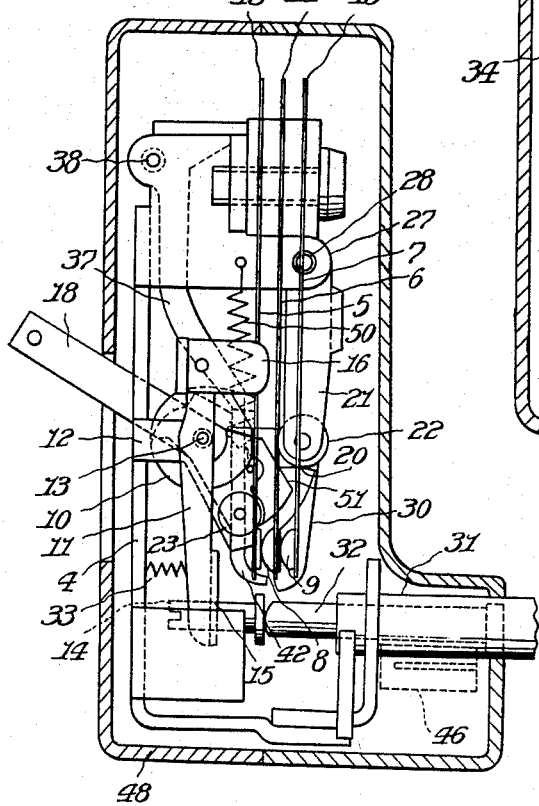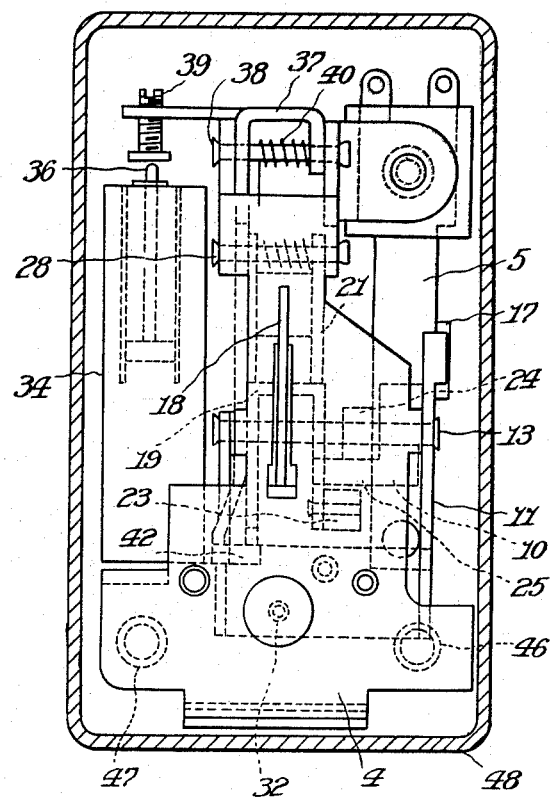

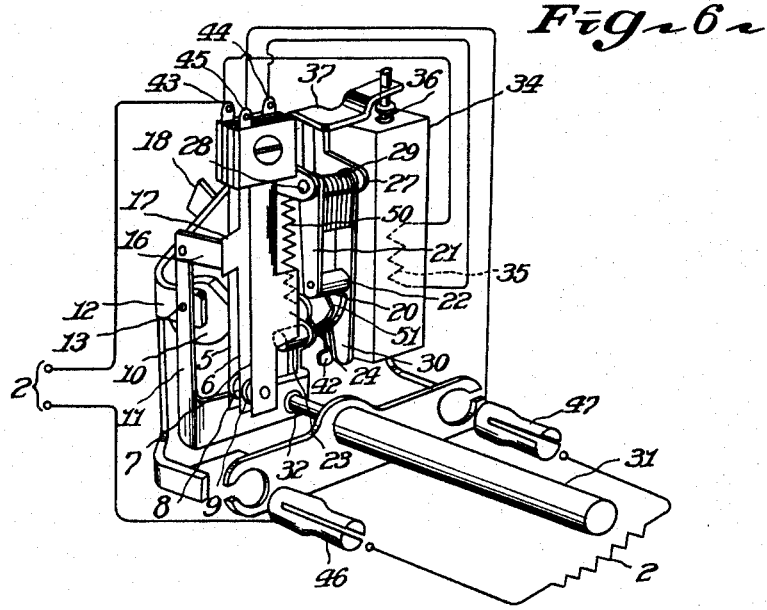
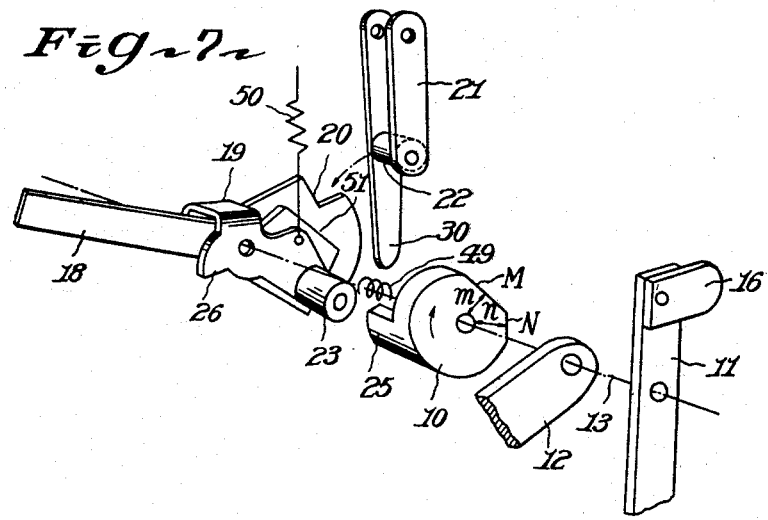

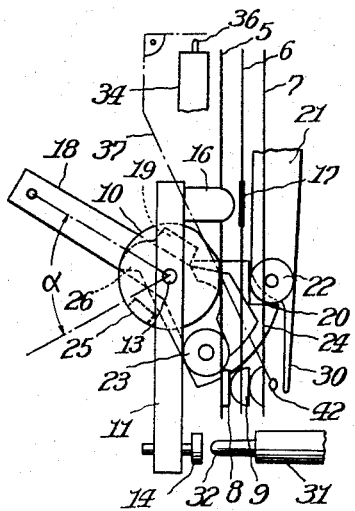
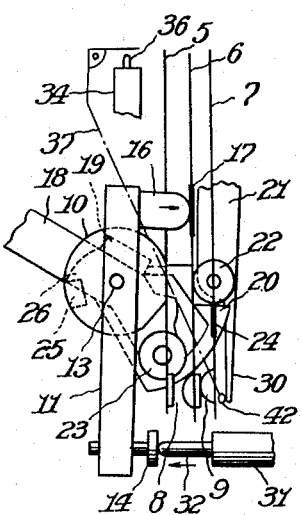
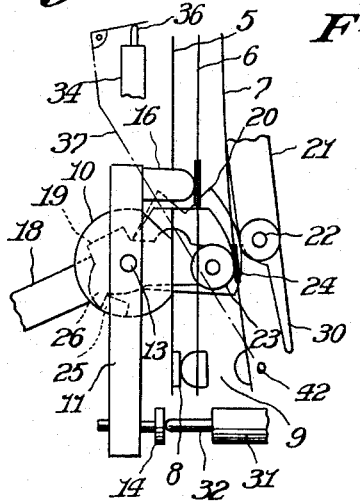
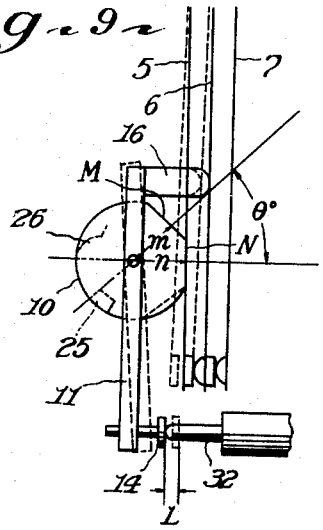

United States Patent Office 3,190,989
Patented June 22, 1965

3,190,989
DETACHABLE AUTOMATIC TEMPERATURE CONTROL PLUG
Tatsuro Komatsu, Yoshiwara-shi, Japan, assignor to Tokyo Shibaura Denki Kabushiki Kaisha, Kawasaki-shi, Japan, a joint-stock company of Japan
Filed Feb. 14, 1962, Ser. No. 173,214
Claims priority, application Japan, Feb. 22, 1961, 36/5,718
3 Claims. (Cl. 200—136.3)

This invention relates to automatic rice cookers, more particularly to an aultomatic temperature control device for rice cookers of simple construction having small or substantially on heat storage capacity.

Prior electric rice cookers are constructed as double or triple type so as to have substantial heat storage capacity and generally utilize a process of rice cooking comprising the steps of energizing an electric heater usually provided at the bottom of the cooker, deenergizing the electric heater when the water in the cooker is absorbed by the rice particles, and the temperature of the cooker rises abruptly, and alphanizing, or converting the solid state starch contained in the rice particles to gelatinized state and drying the cooked rice to a suitable point by utilizing the heat stored in the cooker itself. To this end, the bottom of the cooker where the electric heater is mounted is formed to have a substantial mass, or thickness, and the cooker is provided with a spaced outer jacket to define a heat insulating chamber. As the result of this, the construction of the rice cooker becomes more complicated, requires more material and labor to manufacture, and hence the price of the cooker is high. Moreover, from the standpoint of heat economy, heat quantity stored in the heat storage portion of the cooker becomes useless after alphanization has been completed. Therefore, it is advantageous to cook rice by utilizing a cheap and simple single wall electric pot or kettle with an electric heater directly mounted on its bottom because it is cheap and yet provides high thermal efficiency. In order to prepare delicious boiled rice without forming a hard charred crust, however, it is necessary to utilize a process comprising the first step wherein water is caused to be absorbed by the rice particles by relatively strong initial heating and the second step wherein heat is decreased so as to thoroughly alphanize the rice particles without charring, while at the same time to suitably dry the boiled rice by expelling surplus moisture. While numerous attempts have been made in the past to automatically carry out the above two steps, none of them have proved satisfactory. More particularly, a conventional thermostat or bimetal mounted on the bottom of the pot will operate in the first step and thus be unable to automatically control the second step, while a timer utilizing a clock mechanism and the like will not operate satisfactorily because the instant at which the electric heater should be deenergized must be varied depending upon the quantity of rice to be cooked. Moreover, such means are affected by the surrounding temperature so that in the one case, incompletely boiled rice will be obtained, while in the other case, the rice will be heavily charred.

The principal object of this invention is to provide automatic rice cookers which can provide completely alphanized and suitably dried, delicious boiled rice without any charring by utilizing a cheap kettle of less heat storage capacity such as a conventional kettle.

Another object of this invention is to provide a compact automatic temperature control device for rice cookers which can be formed as a detachable plug.

Still another object of this invention is to provide a novel method of cooking rice by utilizing a cheap cooking kettle.

The automatic temperature control device for rice cookers embodying this invention comprises a temperature responsive device actuated by the temperature of a kettle, a first pair of automatic reset type contacts actuated by said temperature responsive device, a second pair of manual reset type contacts, a cam device mounted to contact the spring for the stationary contact of said first contact pair, said cam being adapted to be set at a lower point than the temperature at which said first contact pair operates at the second and succeeding times in response to the change in contact pressure of said contacts at the time of first opening of said first pair of contacts, and a time delay device which initiates timing operation from said first opening of said first pair of contacts to open said second pair of contacts after a predetermined time interval. The novel automatic temperature control device is formed as a plug and is detachably mounted on a rice boiler or kettle which may be a simple single walled pot with a suitable electric heater mounted on its bottom.

The novel method of cooking rice comprises the steps of putting rice and water into a kettle which has a relatively small heat storage capacity and is equipped with said automatic temperature control device, heating said rice and water by energizing an electric heater provided for said kettle, deenergizing said heater by opening a first pair of contacts when the temperature of the kettle abruptly rises to a peak value, say, for example 130° C., from 100° C. upon completion of absorption of the water by the rice particles, automatically changing the setting of the operating temperature of said first pair of contacts to a temperature lower than said peak value simultaneously with said deenergization, repeating interruption and closing of said contacts to maintain the temperature at about 100° C. for a predetermined time interval so as to complete alphanization and drying of the boiled rice, and finally opening manual reset contacts to deenergize said electric heater, said manual reset contacts being actuated by a time delay device which initiates its timing operation from the first opening of said first pair of contacts.

The features of this invention which are believed to be new are set forth with particularity in the appended claims. This invention, however, both as to organization and method of operation together with further objects and advantages thereof may best be understood by reference to the following description taken in conjunction with the accompanying drawings, in which:

FIG. 1 diagrammatically illustrates, in section, a rice cooker equipped with a temperature control device embodying this invention;

FIG. 2 shows a connection diagram of the temperature control device according to this invention;

FIG. 3 shows a graph showing the relation between heating time and temperature of a rice cooker controlled by the control device of this invention;

FIG. 4 is a rear view of the temperature control device to illustrate the arrangement of its mechanism;

FIG. 5 is a side view of the temperature control device;

FIG. 6 is a perspective view of the mechanism as viewed from the front side;

FIG. 7 is a perspective view showing the relation between an operating lever, latching lever, latching member, cam and a contact push rod;

FIG. 8 shows certain portions of the control device for explaining the operation thereof wherein A illustrates the initial stage of current flow, B shows the operated state of the cam at the highest temperature, and C the state of current interruption upon completion of heating; and FIG. 9 shows a diagram for explaining the relation between the cam and contacts.

Referring now to FIG. 1 of the accompanying drawing, the rice cooker comprises a single walled kettle 1 of relatively small heat storage capacity, such as a relatively deep pot of thin aluminium sheet and an electric heater, for example, a sheath wire 2, fixed to the bottom of the pot by suitable means, for example soldering. An automatic temperature control device 3 embodying this invention is formed as a detachable plug.

As shown in FIG. 2 and FIGS. 4 to 7 inclusive, the automatic temperature control device of this invention comprises a stationary contact spring 5, an automatic contact spring 6 and a manually operated contact spring 9 which are made of suitable elastic metal strips. The aligned upper ends of the springs are secured to a frame 4 by means of suitable insulating spacers interposed between them, while the lower ends of the springs constitute a first pair of contacts 8 and a second pair of contacts 9 arranged in series. These contacts are normally biased toward the left (FIG. 5) to engage each other since the fixed contact spring 5 is engaged by a cam 10 to be explained later. A contact push rod 11 is pivoted around a main shaft 13 journalled in brackets 12 of the frame 4, and a plate 15 having an adjusting screw 14 is secured to the lower end of the push rod 11. A push member 16 secured to the upper end of the push rod 11 cooperates with a lug 17 on one side edge of the automatic contact spring 6 (FIG. 6). As shown in FIGS. 4 and 7, an operating lever 18, a latching lever 19 and a cam 10 are loosely mounted on the main shaft 13. As shown in FIG. 7, the latching lever 19 has two bifurcated arms, one having a notch 20 adapted to receive a roller 22 supported by levers 21, and the other having an insulating roller 23 on one side thereof, said roller 23 facing a lug 24 on the manually operated contact spring 7 (FIG. 6). The cam 10 has two inclined surfaces M and N spaced from its axis by the distances $m$ and $n$, respectively, where $m<n$. The cam also has an axial projection 25 adapted to engage a pawl 26 of the latching lever 19 to reset the cam which normally is biased in the clockwise direction by a coil spring 49. As best shown in FIG. 6, said latching levers 21 are pivoted on a shaft 28 journalled in brackets 27 of the frame 4 and biased in the counterclockwise direction by a coil spring 29, and the lower end of one of the latching levers 21 is elongated downward to provide a tripping member 30. To the lower end of the frame 4 there is secured a suitable temperature responsive device 31, which in the illustrated example is shown as a hollow plug containing an expansible liquid, such as a silicone oil, and a piston (not shown) with a piston rod 32. The plug is inserted in a socket secured to the bottom of the kettle 1 in good heat transfer relation. The free end of the piston rod 32 or the actuating rod is arranged to be pressed against the plate 15 against the bias of a compression spring 33 interposed between the push rod 11 and the frame 4.

A suitable timer 34 is mounted on the frame 4. While any suitable temperature responsive type timer may be used, the timer diagrammatically shown in FIG. 2 comprises a casing containing therein a liquid, such as silicone oil, expansible under heat, a piston with a piston rod 36 and an electric heater 35 of small power rating to heat said liquid. It is preferable to use a two or three watt, 3 kilohm carbon film resistor as the electric heater. When the liquid is sufficiently heated, it expands to push the piston rod 36 to release the latching device 41.

A releasing lever 37 is pivoted on the upper portion of the frame 4 by means of a pin 38. An adjustable screw 39 attached to one end of the lever 37 normally abuts against the piston rod 36 while the lower end 42 of the lever 37 is facing toward the tripping member 30 of the latch 21, whereby when the rod 36 is pushed out, the releasing lever is rotated in the counterclockwise direction around the pin 38 against the force of a spring 40 to disengage the roller 22 from the notch 20 of the latching member 19.

An inclined surface 51 is formed on the lower portion of the operating lever 18 so as to permit this lever to rotate by a slight angle independently of the latching member 19, thus driving the roller 22 out of the notch 51 when the lever 18 is operated manually.

As shown in FIGS. 2 and 6, the electric heater 35 of the timer 34 is connected between contact springs 6 and 7 through their terminals 44 and 43, and in the state shown in FIG. 2, this heater is short circuited by the contacts 8. The frame 4 and various components supported thereby are enclosed by a suitable casing 48 of insulating material, and sockets 46 and 47 are secured to said casing to project therefrom on the opposite sides of the temperature responsive device 31.

The operation of the automatic temperature control device is as follows:

The automatic temperature control device of this invention operates in three steps. At first the automatic temperature control device is attached to the rice cooker, and a suitable quantity of rice and water is put in the kettle 1, as shown in FIG. 1. Then the operating lever 18 is raised or rotated about the axis 13 in the clockwise direction as shown in FIG. 8A. Then the roller 22 supported by the latching member 21 engages the notch 20 of the latching lever 19 to hold the operating lever 18 in this position. As stated above the resiliency of contact springs 6 and 7 has a tendency to bias toward the left so that the first and second pairs of contacts 8 and 9 are closed to energize the electric heater 2 of the rice cooker. At this time the heater 35 of the timer is short circuited by the first pair of contacts 9 as described above.

During the initial stage of heating, all of the heat generated by the heater 2 is consumed to heat the water and rice contained in the kettle, and the rice particles absorb water and gradually swell or alphanize. When nearly all of the water has been absorbed by the rice particles, the temperature of the cooker or kettle 1 rises abruptly to about 130° C., as shown by a curve E of FIG. 3. At this instant $T_1$ and first interruption of the heater 2 is effected. More particularly, thermal expansion of the oil contained in the temperature responsive device 31 moves the operating rod 32 toward the left to move the plate 15 in the same direction through the adjusting screw 14, thereby to rotate the push rod 11 around the main shaft 13 in the clockwise direction so as to cause the push member 16 to engage the lug 17 of the stationary contact spring 6. This decreases the pressure between the cam 10 and the stationary contact spring 5 exerted by said contact spring 6 so that the cam is caused to be rotated by an angle $\theta$ (FIG. 9) by the action of the coil spring 49 to assume the state shown by FIG. 8B wherein the first contacts 8 are opened. As shown in FIG. 9, since the height $m$ of the cam surface M is smaller than $n$ of the cam surface N, the contact spring 5 can retract to a position indicated by dotted lines to open the contacts 8. As shown in FIG. 2, insertion of a high resistance 35 in series with the electric heater 2 of the rice cooker caused by the opening of the contacts 8 will substantially stop heat generation from the heater 2. During this second step, as the temperature of the rice cooker gradually decreases, the operating rod of the temperature responsive device 31 gradually retracts to release the push rod 11 and reclose the first pair of contacts 8 at the position indicated by dotted lines of FIG. 9. The rice cooker will again be heated, and the temperature of the temperature responsive device 31 will again rise to cause the operating rod 32 to engage the rod 11. As shown in FIG. 9, at this time the press member 16 actuates the contact spring 6 at an earlier point before the cam 10 rotates through $\theta$ degrees. This is because the adjusting screw 14 has been moved to the right by a distance L by the rotation of the cam, since $m<n$. As a result of this, the first pair of contacts 8 are closed at a temperature lower than that at which they were opened in the first interruption.

Opening of contacts 8 again cause decrease in the temperature of the rice cooker and of the temperature responsive device 31 to retract the operating rod 32. Thus, the first pair of contacts 8 are again closed, and this cycle of operation is repeated several times (FIG. 8B).

This second step of repeating closure and interruption is shown by a period between $T_1$ and $T_2$ of FIG. 3 wherein the temperature of the boiled rice in the rice cooker is maintained at about 100° C. to complete alphanization and desired drying without the accompaniment of any charring.

During the second step, the electric heater 35 of the timer 34 is energized when the first pair of contacts 8 are opened so that the oil in the timer is gradually heated to expand and push out the rod 36, whereby the lower end 42 of the release lever 37 moves outward the tripping member 30 of the latch 21. Thus, the roller 22 is disengaged from the notch 20 thereby permitting the spring 50 to rotate the latching lever 19 around the shaft 13 in the counterclockwise direction. Due to this motion the insulating roller 23 carried by the latching lever is caused to engage the lug 24 of the manually operated contact spring 7 to open the second pair of contacts 9 against the bias of said spring, thus completely disconnecting the heater 2 from the source of electric supply, as shown in FIG. 8C. At this point the cooking of the rice is completed.

The cam 10 is restored to the original position through counterclockwise rotation of $\theta$ degrees of the latching lever 19 effected by engagement between the pawl 26 and the projection 25 of the cam.

Since, at this time, the first and second pairs of contacts are in their closed position, the frictional force acting upon the cam 10 is sufficiently large to hold it in the restored position.

When it is desired to open the second pair of contacts 9 at any time during heating of the rice cooker, the operating lever 18 is pushed downward to disengage the roller 22 out of the notch 20 by an inclined surface 51 of said lever, thereby tripping the latching member.

In accordance with this invention, cooking of rice is automatically effected by a novel method comprising the steps of effecting the first interruption of heating at the time of abrupt increase in the temperature when nearly all of the water has been absorbed by the rice particles, effecting repeatedly the second and succeeding interruptions of heating at a temperature near 100° C. which is considerably lower than the peak temperature at which said first interruption was effected, thereby maintaining the temperature of the boiled rice near 100° C. to enable alpharization and drying of the rice and effecting the third interruption of heating at a predetermined time limit after said first interruption. These steps are illustrated in FIG. 3 wherein a solid line curve E represents the temperature of the kettle and a dotted line curve F represents the temperature of the rice contained in the kettle. As will be clearly noted from the curve F, the temperature of the rice does not exceed 100° C. which means that there is no possibility of overheating of the cooked rice to charring.

Furthermore in accordance with this invention the first pair of contacts 8 is used both for the first interruption at the peak temperature and for the repeated interruption in the second step, and the temperature difference is established by the cam 10 which is operated by the variation in the frictional force provided by the contact pressure so that change over of temperature settings is effected in a simple and positive way, and complicated mechanism effecting these steps of operation can be disposed in a compact plug-shaped casing. In addition, since the temperature at which repeated interruptions are effected during the second step is lower than the peak temperature of the first interruption there is no possibility of charring.

While in the above descriptions, the temperature control device of this invention has been illustrated as being contained in a removable plug-shaped casing, it will be obvious to those skilled in the art that the control device can be directly assembled in the rice cooker.

While a specific method and apparatus in accordance with this invention have been shown and described it is not desired that the invention be limited to the particular configurations and temperatures illustrated, and it is intended by the appended claims to cover all modifications within the sprit and scope of this invention.

What is claimed is:

1. A plug-type automatic temperature control device for use in controlling rice cookers, said rice cookers including a kettle and a resistance heater for heating said kettle, said resistance heater having terminals for electrically connecting said control device to said resistance heater and for mounting said control device on said kettle, said control device comprising: a casing mountable in operation on said kettle; an electrical circuit mounted in said casing in positions electrically isolated therefrom for supplying electrical power to said resistance heater; a temperature-responsive device mounted on said casing in a position electrically isolated therefrom for sensing the temperature within said kettle, said temperature-sensing device being adapted to extend into and outwardly of said casing and said kettle when said casing is mounted on said kettle; other terminals connected in said electrical circuit and mounted in said casing in positions electrically isolated therefrom for electrically connecting said control device with said terminals of said resistance heater, said casing being electrically isolated from said resistance heater when said casing is mounted on said kettle, automatic reset-type contacts in said electrical circuit mounted in said casing in positions electrically isolated therefrom, means in said temperature-responsive device for operating said automatic reset contacts automatically to a closed and an open position repetitively in dependence upon the temperature within said kettle; means comprising a rotatably mounted cam cooperative with said automatic reset-type contacts automatically reducing the temperature at which said automatic reset-type contacts close subsequent to the initial opening thereof by said temperature-responsive device, a thermal time-delay device mounted in said casing in a position electrically isolated therefrom; manual reset-type contacts mounted in said casing in positions electrically isolated therefrom and operated by said thermal time-delay device and connected in said electrical circuit in series with said automatic reset-type contacts; and latching means mounted in said casing in positions electrically isolated therefrom for manually holding closed said manual reset-type contacts, said thermal time-delay device including mechanism for actuating said latching means to a position for releasing said manual reset-type contacts when a predetermined amount of heat is stored in said kettle.

2. A plug-type automatic temperature control device for use in controlling rice cookers, said rice cookers including a kettle and a resistance heater for heating said kettle, said resistance heater having terminals for electrically connecting said control device to said resistance heater and for mounting said control device on said kettle, said control device comprising: a casing mountable in operation on said kettle; an electrical circuit mounted in said casing in positions electrically isolated therefrom for supplying electrical power to said resistance heater; a temperature-responsive device mounted on said casing in a position electrically isolated therefrom for sensing the temperature within said kettle, said temperature-sensing device being adapted to extend into and outwardly of said casing and said kettle when said casing is mounted on said kettle; other terminals connected in said electrical circuit and mounted in said casing in positions electrically isolated therefrom for electrically connecting said control device with said terminals of said resistance heater, said casing being electrically isolated from said resistance heater when said casing is mounted on said kettle, automatic reset-type contacts in said electrical circuit mounted in said casing in positions electrically isolated therefrom, means in said temperature-responsive device for operating said automatic reset contacts automatically to a closed and an open position repetitively in dependence upon the temperature within said kettle; means comprising a rotatable cam cooperative with said automatic reset-type contacts automatically reducing the temperature at which said automatic reset-type contacts close subsequent to the initial opening thereof by said temperature-responsive device, a thermal time-delay device mounted in said casing in a position electrically isolated therefrom; manual reset-type contacts mounted in said casing in positions electrically isolated therefrom and operated by said thermal time-delay device and connected in said electrical circuit in series with said automatic reset-type contacts; and latching means mounted in said casing in positions electrically isolated therefrom for normally holding closed said manual reset-type contacts, said thermal time-delay device including: a sealed casing; a high resistance heating element mounted in said sealed casing in a position electrically isolated therefrom and adapted to be in series with said resistance heater through other terminals, said heating element being normally short-circuited by said automatic reset-type contacts, and means for actuating said latching means to a position for releasing said manual reset-type contacts when a predetermined amount of heat is stored in said kettle.

3. A plug-type automatic temperature control device for use in controlling rice cookers, said rice cookers including a kettle and a resistance heater for heating said kettle, said resistance heater having terminals for electrically connecting said control device to said resistance heater and for mounting said control device on said kettle, said control device comprising: a casing mountable in operation on said kettle; an electrical circuit mounted in said casing in positions electrically isolated therefrom for supplying electrical power to said resistance heater; a temperature-responsive device mounted on said casing in a position electrically isolated therefrom for sensing the temperature within said kettle, said temperature-sensing device being adapted to extend into and outwardly of said casing and said kettle when said casing is mounted on said kettle; other terminals connected in said electrical circuit and mounted in said casing in positions electrically isolated therefrom for electrically connecting said control device with said terminals of said resistance heater, said casing being electrically isolated from said resistance heater when said casing is mounted on said kettle, automatic reset-type contacts in said electrical circuit mounted in said casing in positions electrically isolated therefrom, means in said temperature-responsive device for operating said automatic reset contacts automatically to a closed and an open position repetitively in dependence upon the temperature within said kettle; means comprising a rotatable cam cooperative with said automatic reset-type contacts automatically reducing the temperature at which said automatic reset-type contacts close subsequent to the initial opening thereof by said temperature-responsive device, a thermal time-delay device mounted in said casing in a position electrically isolated therefrom; manual reset-type contacts mounted in said casing in positions electrically isolated therefrom and operated by said thermal time-delay device and connected in said electrical circuit in series with said automatic reset-type contacts; and latching means mounted in said casing in positions electrically isolated therefrom for normally holding closed said manual reset-type contacts, said thermal time-delay device including: a sealed casing; a body of expansible fluid contained in said sealed casing; a high resistance heating element connected in said circuit and mounted in said sealed casing in a position electrically isolated therefrom for heating said expansible fluid, said heating element being normally short-circuited by said automatic reset-type contacts, and a piston mechanism actuated by said expansible fluid for actuating said latching means to a position for releasing said manual reset-type contacts whereby said expansible fluid is heated only when said automatic reset-type contacts are opened and said latching means is actuated by said piston mechanism when a predetermined amount of heat is stored in said sealed casing.

References Cited by the Examiner
UNITED STATES PATENTS

| | | | |
|---|---|---|---|
| 2,472,451 | 6/49 | Whitney | 219—431 |
| 2,641,680 | 6/53 | Turner et al. | 219—43 |
| 2,712,055 | 6/55 | Campbell | 219—44 |
| 2,828,209 | 3/58 | Hollis et al. | 99—80 |
| 2,927,189 | 3/60 | Purpura | 219—44 |
| 2,937,946 | 5/60 | Durrani | 99—80 |
| 2,955,186 | 10/60 | Ritter | 219—489 |

RICHARD M. WOOD, *Primary Examiner.*

ANTHONY BARTIS, *Examiner.*